Figure 1:
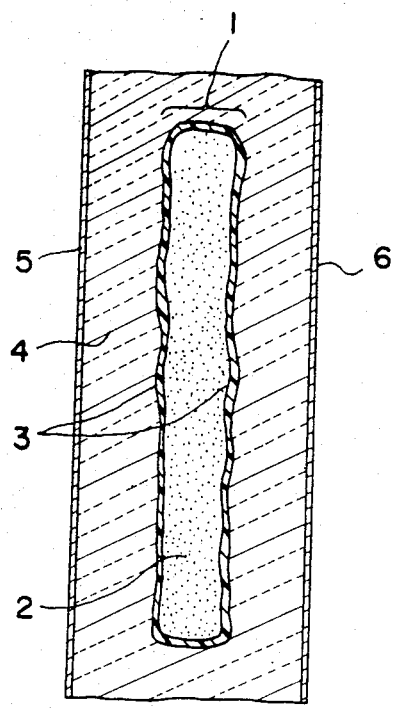

United States Patent

Yamamoto et al.

[11] Patent Number: 4,529,638
[45] Date of Patent: Jul. 16, 1985

[54] THERMAL INSULATOR

[75] Inventors: Ryoichi Yamamoto; Yoshihiro Matsuo; Masanari Mikoda, all of Neyagawa; Yoshihiro Asada, Yao, all of Japan

[73] Assignees: Matsushita Electric Industrial Co., Ltd.; Matsushita Reiki Co., Ltd., both of Japan

[21] Appl. No.: 327,018

[22] Filed: Dec. 3, 1981

[30] Foreign Application Priority Data

Dec. 9, 1980 [JP] Japan .................. 55-174040

[51] Int. Cl.³ .............................. B32B 1/06
[52] U.S. Cl. .......................... 428/69; 428/71; 428/76; 428/305.5; 428/316.6; 220/421
[58] Field of Search .............. 428/69, 71, 76, 72, 428/305.5, 316.6; 220/421, 444, 462; 312/214

[56] References Cited

U.S. PATENT DOCUMENTS 3,264,165  8/1966  Stickel ........................ 428/69
3,769,770 11/1973  Deschamps et al. ......... 428/69 X Primary Examiner—Alexander S. Thomas
Attorney, Agent, or Firm—Barnes, Kisselle, Raisch, Choate, Whittemore & Hulbert

[57] ABSTRACT

A thermal insulator comprises an expanded resin body having embedded therein an evacuated powder insulation portion which consists of fine powder and a container of film-like plastics or a film-like composite of plastics and metal for enclosing the powder. The resin body has been expanded by a Freon gas as a blowing agent. Since a Freon gas has a larger molecular diameter than the constituent gases of air, it is less likely to permeate through the container than air. Thus present invention provides a novel composite insulator which fully utilizes the benefits of vacuum insulation without necessitating a strong and costly material for a vacuum container.

6 Claims, 2 Drawing Figures

U.S. Patent Jul. 16, 1985 4,529,638

THERMAL INSULATOR

The present invention relates to a thermal insulator usable for electric freezers, refrigerators or the like.

Typical materials heretofore used for thermal insulation include inorganic materials, such as glass fiber, or organic materials, such as expanded resin. In machinery for refrigeration or cold storage, electric refrigerators for example, a polyurethane blowed by a Freon gas has been used for thermal insulation and has attained a thermal conductivity of 0.015 Kcal/mh°c. Although various attemps have been made to lower this conductivity as by reducing the size of the individual cells of the foamed polyurethane to a maximum extent, it is not easy to decrease the conductivity to less than 0.013 Kcal/mh°c. Further since trichlorofluoromethane is used as a blowing agent, the foamed polyurethane is theoretically limited in its thermal conductivity to 0.007 Kcal/mh°c which is the conductivity of the blowing gas.

One way to go beyond this limit is the application of the evacuated insulation (vacuum thermal insulation). Two methods are available for evacuated insulation; the high vacuum insulation method in which a gap formed in a double container is highly evacuated as in the case of a thermos bottle, and the evacuated powder insulation method in which a gap in a double container is first loaded with fine powder and thereafter evacuated. The latter method features that it does not require a high vacuum as opposed with the former. However either method has a drawback of necessitating a rigid and tough material for the double container as long as it utilizes vacuum. Thus the evacuated insulation is not adapted for applications, such as electric refrigerators, where production cost, weight and applicability to quantity production are significant factors.

It is therefore an object of the present invention to provide a thermal insulator which fully utilizes the benefits of evacuated insulation and yet which, with simple and cheap construction, can provide for reliable vacuum leak protection without necessitating a strong material for a vacuum container.

In order to fulfil this object, the present invention provides a thermal insulator comprising an expanded resin body having embedded therein at least one evacuated powder insulation portion.

According to this arrangement, since the evacuated powder insulation portion is directly surrounded by the resin body, it does not require a strong container for vaccum leak protection.

According to a preferred embodiment of the present invention, said resin body is expanded by a Freon gas as a blowing agent. Since a Freon gas has a larger molecular diameter than the component gases of air, it is less likely to leak through a container for the insulation portion than air. The vacuum container, if coated with a metal, provides a further protection against vacuum leak.

Figure 2:
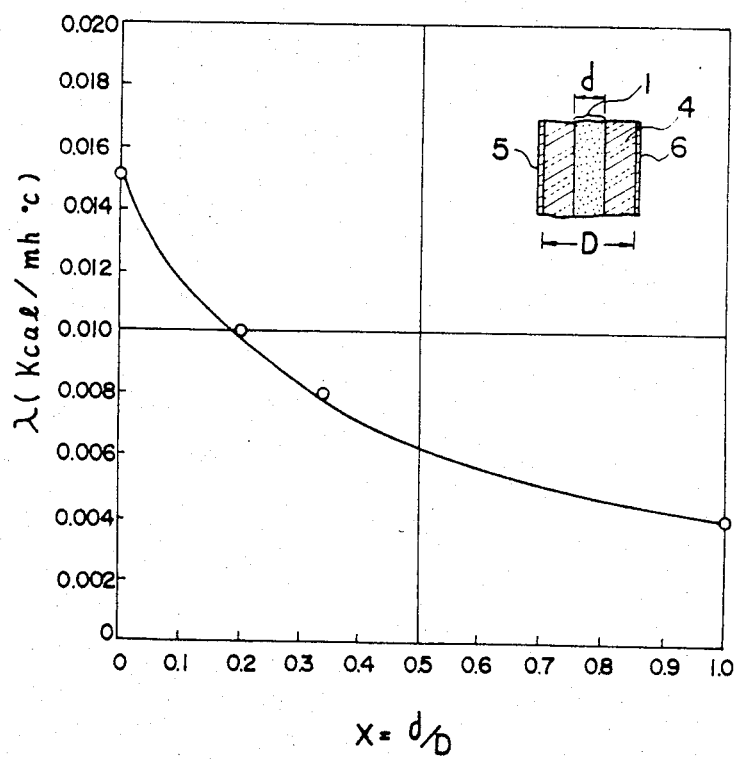

These and other numerous features and effects of the present invention will become apparent from the following description of an embodiment given with reference to the accompanying drawings, in which:

FIG. 1 is a sectional view showing a basic configuration of a thermal insulator embodying the invention, FIG. 2 is a graph illustrating the effects of the insulator according to the invention.

Referring to FIG. 1, a layer-form evacuated powder insulation portion designated by the reference numeral 1 comprises fine powder 2 and a container 3 enclosing the powder 2. The container 3 has been evacuated; i.e., the spaces between the grains of the powder have been evacuated. The insulation portion 1 is embedded in an expanded resin body 4 provided with outer walls 5 and 6.

The fine powder 2 may consist of particles of the same or different materials having diameters of $1\mu$ to 1 mm and optional shapes. In case a mixture of different materials is used for the powder, the mixture ratio is optional. The material may be organic or inorganic but is required to have a low thermal conductivity and a low weight. Thus the grains of the material are preferably in the form of a hollow spherical body. Foamed perlite powder, for example, is particularly suitable.

Materials suitable for the container 3 includes plastics or a composite of plastics and metal. The container should preferably be made of a deformable film in stead of a rigid plate. This is because a container of a rigid plate may break upon evacuation while a container of a deformable film, when evacuated, conforms intimately to the outer surface of the powder layer 2 without the problem of strength. The plastics film 3, if incorporating a lamination of a thin metal layer, provides for higher protection against vacuum leak.

The foamed resin body 4 should contain in its distinct cells a gas, such as a Freon gas, which has a lower thermal conductivity than air. Thus a polyurethane expanded by at least one Freon gas is suited for the resin body 4. Further the use of a Freon gas as a blowing agent contributes to protection against possible vacuum leak from the container 3 since a Freon gas has a larger molecular diameter than the constituent gases of air and is thus less likely to permeate through the container 3 into the insulation portion 1. This is why a container of merely a plastics film can maintain vacuum in this insulator.

Materials for the outer walls 5 and 6 may be metal or plastics and should be chosen according to applications. In the case of an electric refrigerator, one of the outer walls which provides the external appearance surface of the refrigertor is made of metal in view of strength while the other which defines the interior storage room is made of plastics in view of production cost and adaptability to quantity production.

While only one evacuated powder insulation portion 1 is illustrated in FIG. 1 as embedded in the expanded resin body 4 in the form of a layer, it should of course be understood that there are no limitations on the number, shape and size of such portions, provided that they are embedded in the resin body 4.

Two specific examples of an insulator according to the present invention will now be described.

A bag-form container of vinyl chloride film was packed with perlite powder for vacuum insulation (available from Mitsui Mining & Smelting Co., Ltd.) and thereafter evacuated to a vacuum of $10^{-2} \sim 10^{-1}$ Torr to provide an evacuated powder insulation layer 1 of about 1 cm in thickness. The measured thermal conductivity of the insulation layer 1 was about 0.004 Kcal/mh°c. The insulation layer thus formed was brought into a container having a pair of 1 mm thick plastics plates spaced apart by 5 cm and serviceable as outer walls 5 and 6, and fixed between the pair of plastics plates. Subsequently a fluidized polyurethane, while being expanded by a blowing agent, was poured into the container to form an expanded resin body 4 enclosing the insulator layer 1 in intimate contact therewith.

The same operation as above was repeated except that the pair of plastics plates were spaced apart by 3 cm to provide an insulator of 3 cm in thickness.

In the foregoing examples, trichlorofluoromethane and a mixture of trichlorofluoromethane with dichlorodifluoromethane were used as the blowing agent, and both proved suitable. The thermal conductivity of the expanded polyurethane alone was about 0.015 Kcal/mh°c. The thermal conductivity of the insulator having a thickness of 5 cm (of which 1 cm is the thickness of the insulation layer 1) was approximately 0.01 Kcal/mh°c while that of the insulator having a thickness of 3 cm (of which 1 cm is thickness of the insulation layer 1) turned out to be as low as about 0.008 Kcal/mh°c.

In FIG. 2, the thermal conductivity $\lambda$ is plotted on the ordinate against the ratio ($X=d/D$) of the thickness d of the insulator layer 1 to the overall thickness D of the insulator. The open circles represent the values actually determined in the foregoing examples and the solid line shows theoretically calculated values. It is seen from this graph that the provision of an evacuated powder insulation layer in a foamed resin body produces remarkable effects.

What is claimed is:

1. A thermal insulator comprising an expanded resin body having embedded therein at least one evacuated powder insulation portion, said insulation portion comprising fine powder and a film-like flexible container enclosing said powder.

2. A thermal insulator as defined in claim 1 wherein said container is made of film-like plastics or film-like composite of plastics and metal.

3. A thermal insulator as defined in claim 1 wherein said resin body is made of a polyurethane expanded by at least one Freon gas.

4. A thermal insulator as defined in claim 1 wherein said insulation portion is provided in the form of a layer.

5. A thermal insulator as defined in claim 1 wherein said powder comprises fine powder of an inorganic substance or plastics, the grains of the powder being in the form of a hollow spherical body.

6. A thermal insulator as defined in claim 1 wherein said resin body has been expanded by trichlorofluoromethane or a mixture of trichlorofluoromethane and dichlorodifluoromethane.

* * * * *